Aug. 25, 1959 H. SCHMIDT, JR., ET AL 2,901,115
FILTERING APPARATUS
Filed May 24, 1957 3 Sheets-Sheet 1
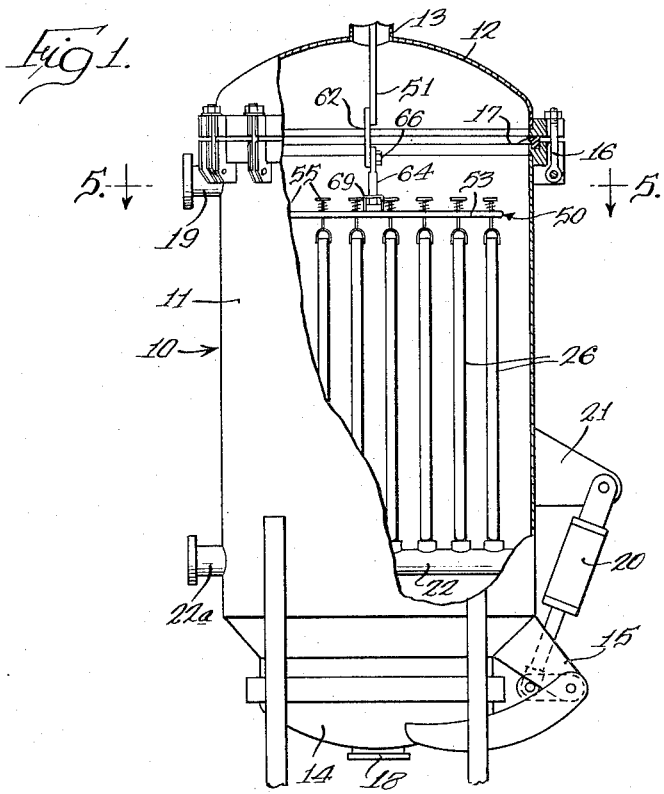
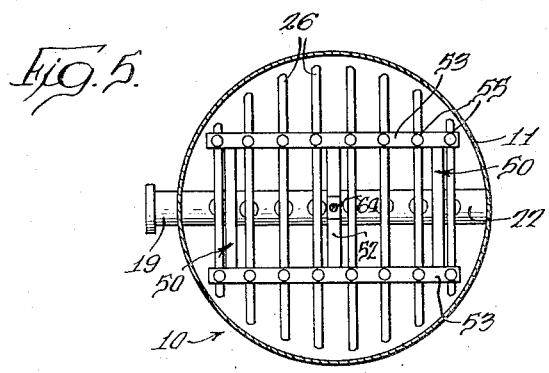
INVENTORS
Henry Schmidt Jr.
Raymond F. Ledford
BY
Mason, Kolehmainen, Rathburn & Wyss
Attys.

Aug. 25, 1959     H. SCHMIDT, JR., ET AL     2,901,115
FILTERING APPARATUS
Filed May 24, 1957     3 Sheets-Sheet 2
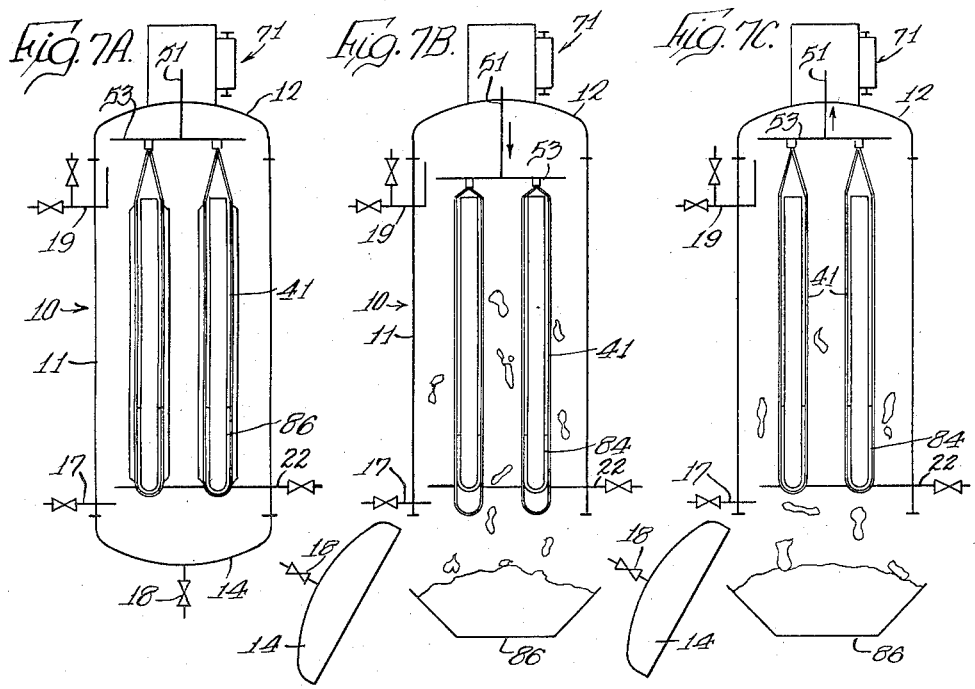
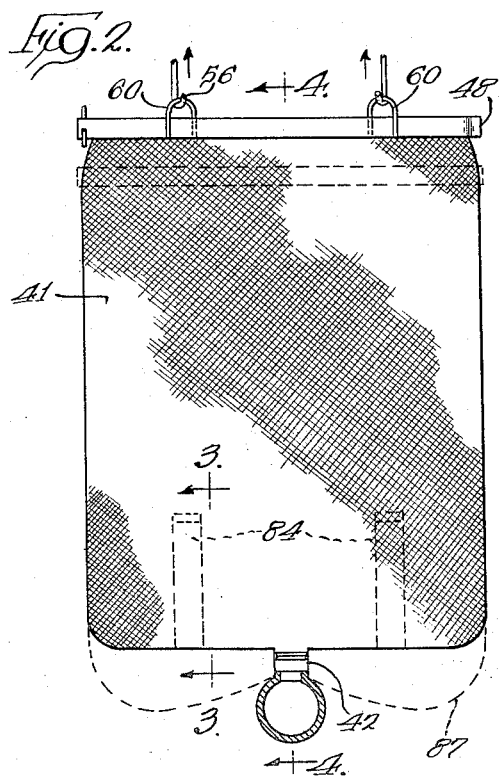
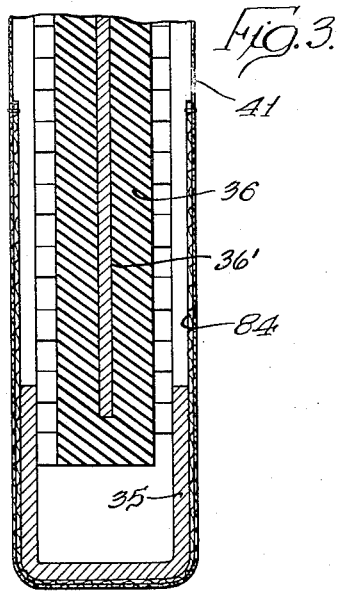
INVENTORS.
Henry Schmidt Jr.
Raymond F. Ledford
BY
Mason, Kolehmainen, Rathburn & Wyss
Attys.

Aug. 25, 1959   H. SCHMIDT, JR., ET AL   2,901,115
FILTERING APPARATUS
Filed May 24, 1957   3 Sheets-Sheet 3
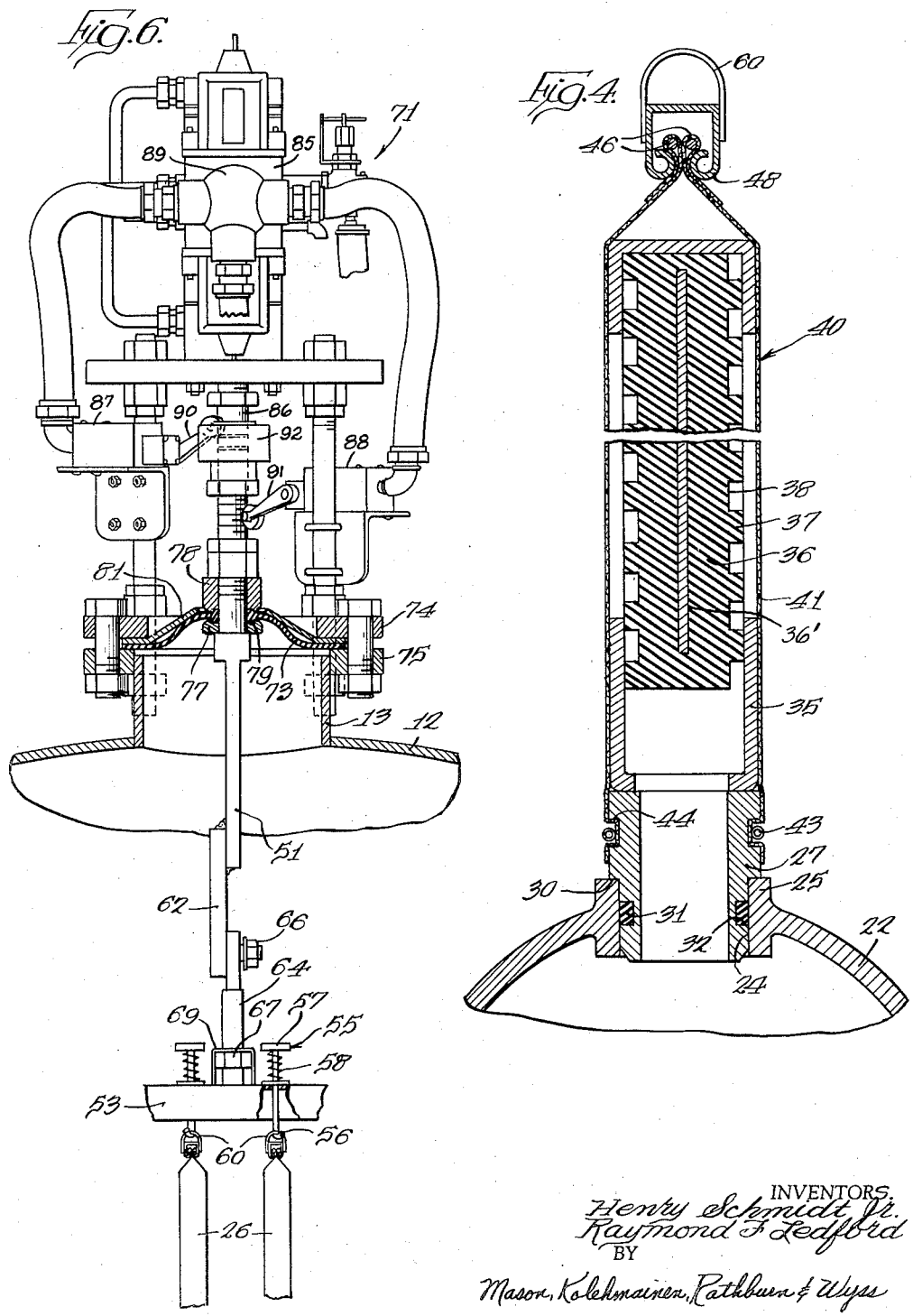
INVENTORS.
Henry Schmidt Jr.
Raymond F. Ledford
BY
Mason, Kolehmainen, Rathburn & Wyss
Attys United States Patent Office 2,901,115
Patented Aug. 25, 1959

2,901,115

FILTERING APPARATUS

Henry Schmidt, Jr., Hinsdale, and Raymond F. Ledford, Riverside, Ill., assignors to Industrial Filter & Pump Mfg. Co., Chicago, Ill., a corporation of Illinois Application May 24, 1957, Serial No. 661,363

8 Claims. (Cl. 210—331)

The present invention relates to filtering apparatus and more particularly to apparatus for removing a filter cake from hollow filter leaves.

Filtering apparatus of the type with which the present invention is primarily concerned generally comprises a plurality of spatially arranged, hollow filter leaves which are connected to a common outlet manifold. The leaves, which are perforate, are supported within a hermetically sealed tank and the liquid to be filtered is pumped into the tank under pressure. As the liquid passes through the leaves into the outlet manifold, the particles to be removed from the liquid are forced against the filter leaves or against a porous precoat layer previously built up thereon, and being too large to penetrate the precoat layers and/or the leaves themselves, the particles are deposited on the perforate faces of the filter leaves. The particles which are thus removed from the liquid form a porous filter cake which must be removed from the leaves when it becomes sufficiently thick to interfere with the efficient operation of the filter.

Inasmuch as the effluent passes through the cake during actual use of the filter, when the filtering apparatus is initially shut down for cleaning, the cake is moist or wet and can be removed in this wet state in many ways, such, for example, as by spraying a liquid stream against the cake or by reversing the flow of liquid through the chamber. In this manner the cake is broken up and suspended in a liquid before it is discharged from the chamber. This is called a wet discharge cake removal. In many situations, such, for example, as where the cake is highly toxic, it is desirable, if not necessary, to remove it from the tank in a relatively dry state. This is called a dry cake discharge.

This invention is particularly concerned with the cleaning, either by means of a wet or dry cake discharge, of filter leaves of the type which comprise an externally grooved core member or other suitable supporting frame which is covered with a fabric bag. During normal use, the effluent passes through the bag into the grooves of the core and into an outlet manifold through which a plurality of such leaves are similarly connected. Accordingly, the filter cake is deposited on the outside surface of the bag, and it would be desirable to provide automatic or semiautomatic apparatus for periodically removing this filter cake from the bag.

Therefore, it is an object of the present invention to provide new and improved filtering apparatus which includes means for removing a filter cake from the filter leaves.

Another object of this invention is to provide new and improved apparatus for removing a filter cake from a filter leaf of the type comprising a central core enclosed in a flexible porous bag.

A further object is to provide filter leaf cleaning apparatus which may be used for effecting either a wet or dry discharge, which may be operated manually, automatically, or semi-automatically, which may be used in conjunction with highly corrosive materials under high pressure, and which has a manufacturing cost which is relatively low as compared with the filtering equipment with which it is to be used.

Very briefly, the above and further objects are realized in accordance with the present invention by providing resilient means for biasing the bag in one position with respect to the core, and reciprocating means connected to the bag for shaking or snapping it relative to the core.

The invention, both as to its organization and method of operation, together with further objects and advantages thereof, will best be understood by reference to the following detailed description taken in connection with the accompanying drawings, in which:

Fig. 1 is a side elevational view, partly in section, of a filter incorporating an illustrative embodiment of the present invention;

Fig. 2 is a side elevational view of a filter leaf mounted within a filter chamber;

Fig. 3 is a sectional view taken along the line 3—3 of Fig. 2;

Fig. 4 is a sectional view taken along the line 4—4 of Fig. 2;

Fig. 5 is a sectional view taken along the line 5—5 of Fig. 1;

Fig. 6 is an enlarged, partially sectioned view of the upper portion of the filter of Fig. 1; and Figs. 7a, 7b, and 7c are schematic views of a filter in the various stages of a filter cake removal operation.

Refer now to the drawings and particularly to Fig. 1, thereof, wherein is shown a filter tank 10 comprising a cylindrical housing 11 over the top of which is provided a cover 12 having a centrally disposed port 13 defined by an upstanding cylindrical member. The bottom of the housing 11 is closed by means of a bottom cover 14 which is pivotally attached to the housing 11 by means of a hinge 15 which is connected to the cover 14 by any suitable means such as welding. Since the filter is operated at relatively high pressures, the top and bottom covers 12 and 14 include means such, for example, as sealing gaskets (not shown) for effecting a tight seal between the covers and the housing 11. During normal operation of the filter, including periodic cleansing thereof, the top cover 12 remains secured to the housing 11 and, therefore, may be clamped in place by means of a plurality of suitable clamps 16 which are attached to the cover 12 and engage the lower edge of an annular flange 17 on the top of the housing 11. An inlet duct 17 (Figs. 7a, b and c) is provided in the side of the tank for admitting the liquid to be filtered into the chamber, and a drain duct 18 is provided in the bottom cover 14 for draining the filter for cleaning, maintenance, and the like. Also, a vent duct 19 is provided near the top of the housing 11 so that liquid may be run through the tank independently of the filtering leaves which are located therein. In order to move the bottom cover out of engagement with the housing 11, a pneumatically or hydraulically operated cylinder 20 is operatively connected between the hinge 15 and a bracket 21 which is affixed and extends from the outer wall of the housing 11.

A plurality of hollow filter leaves 26 are arranged in spaced apart parallel planes within the tank 10 and, as best shown in Fig. 4, respectively include tubular connectors 27 which depend into suitable apertures 24 provided along the top of an outlet manifold 22. A liquid tight seal is provided between the manifold 22 and the connectors 27 by means of bushings 25 which are welded in the apertures 24, and an annular sealing gasket 31 which is disposed within an annular groove 32 in the outer wall of the connector 27. Shoulders 30 which are provided on each of the connectors 27 above the grooves 32, engage the upper edges of the bushings 25 and thus support the core or frame portions of the filter leaves 26 at an elevated position within the chamber. As shown, the manifold 22 extends diametrically across the chamber near the bottom thereof and includes a portion 22a which protrudes from the tank 10 and is suitably sealed thereto as by welding.

The filter leaves 26 are essentially of the type well known in the art and as best shown in Fig. 4 respectively comprise a continuous tubular frame 35 in which is clamped a core member 36 which is provided with a plurality of protruding portions 37 on the opposing faces thereof defining grooves 38 therebetween. As best shown in Figs. 3 and 4 the core 36 includes a rigid center plate 36' which prevents deformation of the core. A bag assembly 40 comprises as its principal element a flexible porous bag 41, which may be formed of a woven fabric, and which encloses the frame 35 and core 36. Therefore, the bag 41 includes a collar 42, best shown in Fig. 2, which depends over the connector 27 and is secured thereto by means of an annular resilient member 43 which wedges a portion of the collar 42 into an annular groove 44 in the connector 27. The bag 41 has an upper open end to facilitate assembly thereof over the frame 35 and associated core 36, and a pair of substantially straight rods or flexible cords 46 are respectively connected in the opposite sides of the bag 41 adjacent the open end for reception in a resilient U-shaped clamping strip 48 which thus closes the top of the bag 41 over the filter leaf frame and core assembly.

As indicated above, the frames 35 and associated cores 36 are supported by means of the connectors 27 on the manifold 22, and in order to support the bags 41 independently of the cores 36, a rectangular shaker frame 50 is supported at the top of the tank 10 from a depending shaker bar 51 which is suitably attached to a centrally disposed cross member 52 in the frame 50. The frame 50, best shown in Fig. 5, is made up of a plurality of channel members which open toward the bottom of the tank 10, the side members 53 of the frame 50 being suitably apertured for the reception of spring loaded hook assemblies 55 which are attached to the clamping members 48 of the bag assemblies 40.

Referring to Fig. 6, the hook assemblies 55 each comprise a member having a hook portion 56 at the lower end and a head 57 at the upper end. A spring and washer assembly 58 are interposed between the top of the side members 53 and the heads 57 so that the hook portion 56 is resiliently biased toward the top of the tank 10. Two such hook assemblies are provided for each bag 41 and respectively extend through oppositely disposed apertures in the side members 53. In order to attach the hooks 56 to the clamps 48 a pair of U-shaped brackets 60 are suitably attached as by welding to the clamp 48 at locations spaced apart by the distance between the sides 53, and the hooked ends 56 extend through the loops of the brackets 60.

As thus far described, it may be seen that the frames 35 and associated cores are supported in the manifold 22 in a fixed upright position and that the bag assemblies 41 are resiliently supported from the shaker bar 51 which depends through the opening 13 in the top of the cover 12. The bar 51 includes an offset portion 62 which is welded thereto to form a two bar weldment so that a vertically disposed connector bar 64 which is attached to the center of the cross arm 52 of the shaker rack 50 is in alignment with the principal portion of the shaker bar 51. The bar 64 is attached by means of a bolt assembly 66 to the offset portion 62 of the bar 51 and is attached to the cross brace 52 by means of a nut 67 which is threadedly engaged with the lower end of the bar 64. The nut 67 is received in a U-shaped bracket or spider 69 which is suitably attached as by welding to the center of the cross brace 52.

Refer now to Fig. 6, wherein the shaker bar is shown directly connected and driven by an electrically controlled pneumatic reciprocating device 71 of a type well known in the art. Very briefly, the reciprocating device comprises an air cylinder 85 having a reciprocable piston connected by means of a drive rod 86 to the bar 51 so that when air is supplied to the bottom end of the cylinder the bar 51 is pulled up and when air is supplied to the upper end of the cylinder the bar 51 is pushed down. A solenoid operated control valve 89 is mounted on the side of the cylinder and depending upon its condition of operation connects a source of pressurized air to either one end or the other of the cylinder 85. A pair of limit switches 87 and 88 control the operation of the valve 89 and are respectively provided with actuating arms 90 and 91 which are operated by a collar 92 mounted on the rod 86. As the rod moves downwardly and approaches the desired lower extreme of its travel, the collar 92 operates the switch 88 to reverse the supply of air to the cylinder 85 to cause it to pull the rod 51 upwardly. In like manner the collar 92 operates the switch 87 near the top of its upward stroke to reverse the supply of air to the cylinder 85 and thus to push the rod 51 downwardly. A centrally apertured circular diaphragm type sealing gasket 73 is secured at its periphery between a pair of annular clamping plates 74 and 75 to the vent defining member 13 and is sealed at its central portion to the rod 51 by means of a pair of opposing clamping members 77 and 78 which are urged against an enlarged hub portion 79 of the gasket 73. Also, a back-up plate 81 is provided to reduce the strain on the gasket 73 while the tank 10 is operated at a high pressure during the normal filtering cycle.

As shown in Figs. 2 and 4, the clamp 48 is spaced, during the filtering operation, at a considerable distance above the top of the frame 35. This allows relative movement between the bag assembly 40 and the frame 35 during the cake removal operation. However, in order to cause the bottom portions of the bag 41 to move away from the frame 35 as the clamp 48 is moved toward the top of the frame 35, each of the bags includes a pair of elastic straps 84 which are each attached at their ends to the opposite inside surfaces of the bag 41 so as to provide U-shaped hangers which engage the bottom member of the frame 35 and are stretched into substantial conformity with the associated portions of the bag 41 when the filter is being used for filtering purposes. In Fig. 2 the filter bags 41 are shown in this position with the elastic bands 84 stretched through their maximum length. During the bag shaking operation when the cake is removed from the bag 41, the clamp 48 is moved downwardly due to the downward movement of the shaker bar 51 and the elastic bands 84 contract so as to pull the lower portion of the bag 41 downwardly with respect to the associated frame 35. In this way the entire bag 41 is moved or shaken relative to the core 36 thereby to remove the filter cake which is located thereon.

Refer to Figs. 7a, 7b, and 7c for a consideration of a typical cycle of operation. With the covers 12 and 14 closed and all lines to and from the tank 10 with the exception of the vent line 19 and the inlet duct 17 closed by suitable valves, a liquid is pumped from a slurry tank into the filter chamber through the inlet duct 17 while the vent line 13 is also connected to the slurry tank. When the filter chamber is filled so that the liquid is returning to the slurry tank through the line connected to the vent 19, a precoat powder of suitable material is added to the liquid in the slurry tank in a predetermined measured amount. The vent 13 is then closed and a connection between the outlet manifold 22 and the slurry tank is opened so that the liquid from the precoat tank with the precoat filter powder suspended therein is now pumped through the bags 41 through the grooves 37 in the spaces of the core 36 into the manifold 22 and back to the slurry tank. The flow of the precoat liquid through the bags 41 causes the precoat powder to bridge over the fine mesh openings in the fabric thus causing an even cake to build up on both sides of each of the leaves 26.

The precoat powder is so shaped as to effect a porous cake which includes minute openings through which the clear liquor may flow but which prevents the passage therethrough of the precoat powder. The precoat powder size may thus be used to determine the size of the suspended solids which may be present in the filtered liquor which is pumped out through the outlet manifold 22 during the filtering cycle. When a sufficiently thick cake of precoat powder has thus been built up on the leaves 26, the line from the inlet duct 17 to the slurry tank is closed and connected to the source of liquid to be filtered. If the manifold 22 had been connected to the slurry tank at this time it is now connected to the line in which the filtered liquid is to be supplied to a suitable reservoir or other process tank. The liquid requiring filtration is now pumped into the duct 17 and the effluent is discharged to a process or storage tank, the suspended solids in the liquid being filtered out on the outside of the precoat filtered cake. In those instances in which the suspended solids in the liquid to be filtered tend to blind the filter cake, i.e., to build up a cake which is impervious to the passage of liquid, a body of filter aid powder may be introduced with the influent in the influent tank or in the line to the duct 17. This will maintain a porous cake and prolong the filter cycle.

When the flow rate through the filter slows down to an inefficient rate which is caused by the build-up of a relatively thick filter cake on the filter leaves 26, which condition can be determined by the pressure within the filtering chamber, the filter cake must be removed. In order to remove the cake by means of a dry cake discharge, the supply of liquid to the chamber through the duct 17 is terminated and compressed air may then be introduced into the chamber through the vent 13 until the level of the liquid in the chamber is below the bottom of the leaves 26. The flow of compressed air through the filter cake causes a sufficient drying thereof so that a dry discharge may then be effected in accordance with the teachings of this invention. The remaining liquid in the tank is then drained through the drain line 18 and the cover 14 is opened by means of the pneumatic cylinder 20.

With the bottom cover 14 thus open, as shown in Fig. 7b, a suitable container 86 is placed beneath the tank 10 and the reciprocating mechanism 71 is set into operation by any suitable means (not shown). The shaker bar is then reciprocated along its longitudinal axis through a substantial distance which may be of the order of inches to cause the bags 41 to shake up and down with respect to the cores 36 of the filter leaves. The springs 58 which are interposed between the shaker rack 50 and the shaker bar 51 prevent an excessive force from being exerted on the bags 41 which might tear them. In Fig. 7b, the elastic bands 84 are shown in a depressed condition thus forcing the bags 41 downwardly off the frames 35; the dotted lines 87 in Fig. 2 indicate the position of the bags when the shaker bar 51 is in its lowermost position. The lengths of the elastic bands 84 are such that they remain partially stretched even when the bar 51 is in its lowermost position so as to effect full movement of the bag with respect to movement of the shaker bar. In Fig. 7c, the shaker bar 51 is shown in its uppermost position with the bottoms of the bags 41 engaging the bottom portion of the respective frames 35. The rapid movement of the bags between the positions shown in Figs. 7b and 7c shakes the filter cake loose from the leaves and it drops into the container 86. After the filter cake has thus been removed from the bags 41, the bar 51 is stopped in its upmost position, the cover 14 is closed, and the above cycle of operation is repeated.

In the event that a wet discharge of the filter cake is required, the filter is cleaned by simply shutting off the inlet and outlet valves, operating the reciprocating device 71 for a few seconds, and draining off the slurry from the tank 10 through the drain line 18. Moreover, where a dry cake discharge is used, more efficient cleaning may be provided by following the dry discharge with a wet discharge, i.e., when the chamber is first filled with the liquid from the slurry tank after the dry cake discharge, the reciprocator 71 is set into operation for a few seconds. This causes any small portions of the cake which remain on the leaves to be suspended in the liquid and thereby to insure an even build-up of a filter cake on the bags 41. If desired, this slurry may be drained through the vent 18.

The present invention thus provides a filter which includes cleaning means in the form of a reciprocator which is isolated from the liquid to be filtered and which may be used to effect a very satisfactory removal of the filter cake either in wet or dry form. Since the reciprocator is isolated from the filter chamber, it may be easily inspected for normal maintenance and repair, and, moreover, it need not be constructed of a corrosion resistant material. This is important because such material, if available, is exceedingly expensive.

While the invention has been described by means of particular embodiments thereof, it will be understood that those skilled in the art may make many changes and modifications without departing from the true spirit and scope of the invention, and accordingly, all such changes and modifications which fall within the true spirit and scope of this invention are intended to be covered in the appended claims.

What is claimed as new and desired to be secured by Letters Patent of the United States is:

1. In filtration apparatus the combination of a plurality of filter leaves each comprising a rigid core and a porous, flexible bag enclosing said core, means for rigidly supporting said cores within a filter chamber, means separate from said last named means movably mounted within said chamber for supporting said bags, and a plurality of resilient means interposed between each of said cores and the associated bags.

2. The combination set forth in claim 1 wherein said resilient means are constituted by elastic straps secured at opposite ends thereof to the internal opposite sides of said bags to form resilient loops which extend over the ends of said cores which are remote from a connection of the respective bags to said movably mounted means.

3. A filter, comprising a filter chamber, an outlet manifold disposed within said chamber near the bottom thereof, a plurality of filter leaves each including a frame and a porous, flexible covering for said frame, said frames being supported on said manifold in liquid flow communication therewith, a seal mounted in a wall of said chamber, a reciprocably mounted member depending into said chamber through said seal, means connecting said member to the top of each of said coverings, means for securing the bottoms of said coverings to the bottoms of said frames, and reciprocating means mounted outside of said chamber and connected to said member.

4. A fitler as set forth in claim 3 wherein said first named means comprises a horizontally disposed frame connected at a plurality of locations to each of said coverings.

5. In filtration apparatus, the combination of a filter chamber, a plurality of filter leaves disposed in said chamber in spaced apart relationship, a plurality of porous, flexible bags respectively enclosing said leaves, an outlet manifold fixedly mounted near the bottom of said chamber, means for fixedly mounting said leaves on said manifold and for connecting a passageway in said manifold to the inside of said bags, resilient means interconnected between the bottoms of said bags and the bottoms of said leaves for biasing said bags downwardly, and reciprocable means connected to the tops of said bags for reciprocating said bags in a vertical direction with respect to said leaves.

6. The combination set forth in claim 5 wherein said resilient means comprises elastic bands disposed in said bags near the bottoms thereof.

7. A filter bag comprising a porous, flexible material forming an open-topped pocket, a collar extending downwardly from the bottom of said pocket, and a plurality of elastic bands disposed in said bag on opposite sides of said collar and connected at the respective ends thereof to opposite sides of said pockets, said bands being of such length as to be engageable with the bottom of said pocket only when in a stretched condition.

8. In filtration apparatus, the combination of a filter chamber, a substantially rigid filter leaf having a central core and a porous flexible covering at least partially enclosing said core, means for mounting said leaf in said chamber, resilient means interposed between said core and said covering, and means separate from said last named means movably mounted within said chamber for supporting said covering and for moving it relative to said core.

References Cited in the file of this patent

UNITED STATES PATENTS

| | | |
|---|---|---|
| 1,086,477 | Stahn | Feb. 10, 1914 |
| 1,806,513 | Van Waldenburg | May 19, 1931 |
| 2,167,236 | Giesler | July 25, 1939 |
| 2,221,210 | Soderquist | Nov. 12, 1940 |
| 2,300,789 | Kelley | Nov. 3, 1942 |
| 2,475,561 | Cooperider | July 5, 1949 |
| 2,480,320 | Carrier | Aug. 30, 1949 |

FOREIGN PATENTS

| | | |
|---|---|---|
| 294,501 | Great Britain | July 23, 1928 |